(12) United States Patent
Gu et al.

(10) Patent No.: US 11,278,010 B2
(45) Date of Patent: Mar. 22, 2022

(54) SOLAR-POWERED AERATION DEVICE FOR SLUDGE TURNOVER AND PLANTING AND METHOD

(71) Applicant: Fishery Machinery and Instrument Research Institute, Chinese Academy of Fishery Sciences, Shanghai (CN)

(72) Inventors: Haitao Gu, Shanghai (CN); Yingshi Xu, Shanghai (CN); Wei Zhong, Shanghai (CN)

(73) Assignee: Fishery Machinery and Instrument Research Institute, Chinese Academy of Fishery Sciences, Shanghai (CN)

( * ) Notice: Subject to any disclaimer, the term of this patent is extended or adjusted under 35 U.S.C. 154(b) by 0 days.

(21) Appl. No.: 16/995,115

(22) Filed: Aug. 17, 2020

(65) Prior Publication Data

US 2021/0127645 A1 May 6, 2021

(30) Foreign Application Priority Data

Oct. 31, 2019 (CN) .......................... 201911054358.1

(51) Int. Cl.
*A01K 63/04* (2006.01)
*A01G 9/02* (2018.01)
(Continued)

(52) U.S. Cl.
CPC .............. *A01K 63/042* (2013.01); *A01G 9/02* (2013.01); *C02F 3/322* (2013.01); *C02F 7/00* (2013.01);
(Continued)

(58) Field of Classification Search
CPC ........ A01K 63/042; A01G 9/02; A01G 31/02; C02F 3/322; C02F 7/00; C02F 11/06; C02F 2101/101; C02F 2101/16; C02F 2103/20; C02F 2201/009; C02F 3/22; C02F 3/165; C02F 3/327; C02F 11/00; C02F 3/32; C02F 2101/30; F04B 37/10; F04B 41/06; F04B 35/00; Y02A 20/212; Y02P 60/21; Y02W 10/10
(Continued)

(56) References Cited

U.S. PATENT DOCUMENTS

| 7,767,094 B2 * | 8/2010 | Nielsen ..................... B08B 9/08 210/747.4 |
| 2005/0045556 A1 * | 3/2005 | Kryzak ..................... B09C 1/08 210/602 |

(Continued)

*Primary Examiner* — Fred Prince
(74) *Attorney, Agent, or Firm* — Mark T. Vogelbacker; Eckert Seamans Cherin & Mellott, LLC

(57) ABSTRACT

A solar-powered aeration device for sludge turnover and planting includes a grow bed fixed on a floating body and floats on water. A bottom of the floating body is fixedly connected with an inner pipe; an outer pipe is sleeved outside the inner pipe. The outer pipe is nested in an air chamber; a bottom of the air chamber communicates and is fixedly connected with a water inlet pipe; the water inlet pipe laterally communicates with a suction tube. An aeration ring is fixedly arranged at a bottom of the outer pipe, and the aeration tube has an air outlet pipe in communication with the outside. A movable foot is rotationally provided at a tail (Continued)

end of the suction tube, and the movable foot adapts to surface fluctuations to swing in a range limited by an angle limiter.

8 Claims, 9 Drawing Sheets

(51) Int. Cl.
    *C02F 3/32*         (2006.01)
    *C02F 7/00*         (2006.01)
    *C02F 11/06*       (2006.01)
    *F04B 37/10*       (2006.01)
    *F04B 41/06*       (2006.01)
    *C02F 101/10*     (2006.01)
    *C02F 101/16*     (2006.01)
    *C02F 103/20*     (2006.01)

(52) U.S. Cl.
    CPC .............. *C02F 11/06* (2013.01); *F04B 37/10* (2013.01); *F04B 41/06* (2013.01); *C02F 2101/101* (2013.01); *C02F 2101/16* (2013.01); *C02F 2103/20* (2013.01); *C02F 2201/009* (2013.01)

(58) Field of Classification Search
    USPC ..... 210/170.06, 170.09, 221.1, 221.2, 242.1, 210/242.2
    See application file for complete search history.

(56) References Cited

U.S. PATENT DOCUMENTS

| | | | |
|---|---|---|---|
| 2005/0142011 A1* | 6/2005 | Tormaschy | B01F 13/0049 417/423.15 |
| 2005/0183331 A1* | 8/2005 | Kania | A01K 61/70 47/65.5 |
| 2007/0039878 A1* | 2/2007 | Roberts | B01F 3/04773 210/605 |
| 2007/0124995 A1* | 6/2007 | Kania | A01K 61/70 47/59 R |
| 2013/0220944 A1* | 8/2013 | Galletta, Jr. | C02F 7/00 210/758 |
| 2013/0270194 A1* | 10/2013 | Allen | E02F 7/065 210/747.4 |

\* cited by examiner

SOLAR-POWERED AERATION DEVICE FOR SLUDGE TURNOVER AND PLANTING AND METHOD

TECHNICAL FIELD

The present invention relates to an aeration device for water for aquaculture, and in particular to a solar-powered aeration device for sludge turnover and planting.

BACKGROUND

China is a main supplier of pond aquatic products. Sediments such as muck and residual feeds are the biggest challenge for aquaculture. After 24 h aquaculture in a pond, it was found that the content of dissolved oxygen was merely 0.8 mg/L in water 0.5 m below water surface and about 6.3 mg/L in the surface layer. The data indicate that the sediments in the pond experienced anaerobic fermentation and then released a great amount of organics, NH3, H2S and other hazardous substances, which polluted water, induced diseases to aquatic products, and hurt the quality and yield of aquatic products.

Existing methods for handling sediments in the pond include sludge removal, solarization of dry ponds, aeration in water, etc. Sludge removal and solarization of dry ponds feature a high cost and a long handling period, and involve placement of the sludge, which seriously affects the benefits. Aerators are usually used to conduct aeration for sludge oxidation, but cannot directly handle the sludge, so the effect is undesirable.

Devices such as impellers, waterwheels, fountains and aerators can increase the content of dissolved oxygen in water and achieve a certain effect after a long time, but generate a relatively high culture cost. Aeration can promote exchange between surface water and bottom water, while algae can absorb organics, $NH_3$, $H_2S$ and other hazardous substances in water and then release oxygen at the presence of sunlight. However, aeration comes with defects. The surface water and bottom water cannot be fully exchanged, and the bottom water and sludge cannot be well mixed with surface water. All existing aerators suffer certain limitations in use.

To obtain high-quality water for aquaculture, the sludge at the water bottom must be handled. At present, the sludge is usually removed by suction, or ponds are dried to remove the sludge after 2-3 years, consuming a lot of labor force and materials.

Above all, the technical issue of how to provide a device for sludge turnover, planting and aeration for pond aquaculture needs to be urgently solved in field.

SUMMARY

The object of the present invention is to provide a solar-powered aeration device for sludge turnover and planting. The device which utilizes solar power for aeration adapts to an uneven bottom of a pond and performs circumferential suction at the bottom of the pond for aeration and sludge turnover, enhancing the content of dissolved oxygen in water and removing volatile hazardous substances such as $NH_3$ and $H_2S$ in water through oxidation and evaporation. Plants or vegetables with strong deep roots are planted on a grow bed which floats on water. Aeration helps the bottom water of a pond mix with the surface water, while algae can absorb hazardous substances in water and then release oxygen at the presence of sunlight, further enhancing the content of dissolved oxygen in water. At the same time, plants with strong deep roots further absorb $NH_3$ and $H_2S$ as well as other hazardous substances and release fresh oxygen.

The present invention adopts the following technical solution:

A solar-powered aeration device for sludge turnover and planting includes a floating body 3. A grow bed 3a is fixed on the floating body 3 and floats on water, and the floating body 3 is fixedly provided with at least one air pump 2. A bottom of the floating body 3 is fixedly connected with an inner pipe 4; an outer pipe 5 is sleeved outside the inner pipe 4; and a group of baffles 6 are fixed on an outer wall of the outer pipe 5. The outer pipe 5 is nested in an air chamber 10; a bottom of the air chamber 10 communicates and is fixedly connected with a water inlet pipe 14; the water inlet pipe 14 laterally communicates with a suction tube 15; and the suction tube 15 swings up and down relative to the water inlet pipe 14. The baffles 6 correspond to top face of the air chamber 10, and the air chamber 10 can drive the outer pipe 5 via the baffles 6 to move upward. The air pump 2 communicates with the air chamber 10 via the inner pipe 4 and the outer pipe 5 sequentially. An aeration ring 12 is fixedly arranged at a bottom of the outer pipe 5 and has an air outlet pipe 12c in communication with the outside. A movable foot 18 is rotationally provided at a tail end of the suction tube 15; the movable foot 18 adapts to surface fluctuations to swing in a range limited by an angle limiter 17; and the suction tube 15 has a suction opening 16 with an inner diameter which reduces from the outside to the inside.

Preferably, two air pumps are arranged on the floating body 3 in parallel, working alternatively or at the same time upon the intensity of sunlight; and plants or vegetables with strong deep roots are planted on the grow beds 3a.

Preferably, the inner pipe 4 is fixed under the floating body 3; the pipe opening of the inner pipe is at a distance of H away from the water surface, and H is the circulation height of the water surface.

Preferably, several openings are provided below the outer pipe 5, each with a cross section bigger than that of the outer pipe 5; the aeration ring 12 is fixed on a support 13a; the cross section of the aeration ring 12 is U-shaped; a thin micro-hole plate 12a is provided at an U-shaped upper opening; an air outlet hose of the air pump communicates with the aeration ring 12 and an air opening 12b; the air opening 12b is provided in an air collection chamber 11; a basal plate 13 is fixed under the openings below the outer pipe 5; and the support 13a is fixed on the basal plate 13.

Further, a limit switch 7 and a solenoid valve 8 are arranged on the top surface of the air chamber 10; the limit switch 7 controls the solenoid valve 8 to open or close; the annular air collection chamber 11 surrounds a middle-lower portion of a sliding sleeve 9a; the air collection chamber 11 has an air vent 9b on the top; the air opening 12b is formed in the air collection chamber; the water inlet pipe 14 is arranged at an outer wall of the air collection chamber 11; a zig-shaped hole 14a is formed at a middle portion of each of the two sides of the pipe opening of the water inlet pipe 14; a seal strip 14b corresponding to the zig-shaped hole 14a is provided at the top and bottom surfaces of the pipe opening, and the sliding sleeve 9a is movably sleeved outside the outer pipe 5.

Further, the suction tube 15 is rectangular; a zig-shaped hole 15a is formed at a middle portion of the two sides of the front end of the suction tube; the zig-shaped hole 15a of the suction tube 15 is connected with the zig-shaped hole 14a such that the suction tube 15 can move up and down on the water inlet pipe 14; each time when a ballast tank 9 completes a cycle of moving up and down, the suction tube 15 is re-located at the water bottom; the suction opening 16 becomes bigger from the inside to the outside and therefore can uniformly suck sludge in a circumferential way; as the movable foot 18 is installed at an outside wall of the suction tube 15, the movable foot 18 inclines backwards by the limit of the angle limiter 17 after the suction tube 15 rises.

Further, a remote control controls the limit switch 7 to normally close the solenoid valve 8; as the buoyancy increases, the ballast tank 9 jacks up the baffles 6 to drive the outer pipe 5 and other components to float continuously until the outer pipe 5 is completely withdrawn; after a new location is selected, the remote control is started to exhaust air in the ballast tank 9 such that the outer pipe 5 sinks together with other components.

Further, the floating body 3 floats on the water surface; the floating body 3 is provided with a solar panel 1 and two air pumps; for proper use of solar energy, the two air pumps work at the same time under normal circumstance and alternatively in case of inadequate sunlight so as to prolong the working cycle; the grow bed 3a is fixed on the floating body 3; plants with strong deep roots are planted on the grow bed 3a; the pipe opening of the inner pipe 4 is at a distance of H away from water surface; an air outlet of each air pump communicates with the aeration ring 12; the aeration ring 12 is fixed on the support 13a in the outer pipe 5; and the air opening 12b is provided in the air collection chamber 11. When the air pumps are started, the aeration ring 12 performs aeration in the outer pipe 5 such that water enters the suction opening 16, flows through the suction tube 15 and the outer pipe 5 sequentially and finally flows out via the pipe opening of the inner pipe 4. The U-shaped aeration ring 12 can prevent the counterflow caused by shutdown from blocking micro holes, and avoid an air pressure from accelerating the water flow during aeration, and aeration in pipes can enhance the content of oxygen dissolved in water by 50% in comparison with aeration in normal state. At the same time, air accumulates in the air collection chamber 11; when the air pressure in the air collection chamber 11 is greater than an attraction force of water flow, air flows into the air chamber 10 via the air vent 9b, and water in the air chamber 10 is exhausted such that the ballast tank 9 floats in the outer pipe 5; after the limit switch 7 hits the baffles 6 to command the solenoid valve 8 to open, air is exhausted from the air chamber 10 such that the ballast tank 9 sinks. During sinking, the movable foot 18 inclines backwards; as the pivot point of the movable foot 18 is eccentric to the gravity center of the suction tube 15, change of the gravity direction of the suction tube 15 results in relocation of the suction tube 15 along the tangent to circumference; the suction tube 15 moves up and down on the water inlet pipe 14 and can flatly and tightly fits the uneven water bottom after sinking, improving the effect of sludge suction. The suction tube 15 is rectangular, and the suction opening 16 which is conical can uniformly suck sludge circumferentially, suitable for suction at an uneven water bottom of a pond. Circumferential suction at the bottom of the pond for aeration and sludge turnover enhances the content of dissolved oxygen in water and removes $NH_3$ and $H_2S$ as well as other volatile hazardous substances in water by oxidation and volatilization. Aeration helps the bottom water of the pool mix with the surface water, and algae absorbs hazardous substances in water and releases oxygen at the presence of sunlight, further increasing the content of dissolved oxygen in water. Sludge turnover and relocation: the remote control 8a is started to command the limit switch 7 to normally close the solenoid valve 8; the ballast tank 9 floats to jack up the baffles 6 on the outer pipe 5 such that the outer pipe 5 is entirely withdrawn; a rope fixed at the floating body 3 can be manually pulled for changing a location; then, the remote control is started to command the limit switch 7 to open the solenoid valve 8, the air in the ballast tank 9 is exhausted such that the outer pipe 5 entirely sinks together with other components, and the suction tube 15 fits the water bottom to overturn the sludge. Each time when a cycle of moving up and down is completed, suction tube 15 is relocated along the tangent to circumference, and the suction tube 15 can flatly fit the water bottom.

The present invention has the following beneficial effects:

1) Solar energy is utilized to drive the air pumps for aeration; two air pumps are connected in parallel, either one of which works when the solar energy is inadequate;

2) Plants or vegetables with strong deep roots planted on the grow bed can increase economic benefits, further absorb a great amount of $NH_3$ and $H_2S$ as well as other hazardous substances in water and release fresh oxygen;

3) The aeration ring is arranged in the sleeve; the outer pipe is sleeved outside the inner pipe; the inner pipe is arranged on the floating body; the pipes perform a telescoping motion to adapt to different water depths; aeration in the pipes can help overturn the sludge at the bottom and expose $NH_3$ and $H_2S$ as well as other hazardous substances in the sludge on the water surface for oxidation and evaporation;

4) Aeration in pipes targets at the bottom water with a low oxygen content, and can continuously increases the content of dissolved oxygen in a low saturation state; aeration in pipes can enhance the content of dissolved oxygen by 50% in comparison with underwater aeration in normal state; aeration in pipes also helps overturn the bottom sludge to expose $NH_3$ and $H_2S$ as well as other hazardous substances in the sludge on the water surface for oxidation and evaporation; as the aeration ring has the U-shaped cross section, a thin micro-hole plate is arranged at the U-shaped opening to prevent counterflow caused by shutdown from blocking micro holes, and the U-shaped aeration ring can reduce resistance to the water flow and prevent an air pressure generated by aeration from accelerating the water flow;

5) The limit switch and the solenoid valve control the ballast tank to move up and down in water, and the remote control controls the solenoid valve to lift and sink the ballast tank;

6) Each time when the floating body containing compressed air completes a cycle of sinking and floating, the ballast tank relocates the suction tube on the slope at the water bottom, and the suction opening becomes bigger from the front to the back, enhancing the effect of sludge suction;

7) Each time the movable foot inclines backward when the suction pipe rises, and the pivot point of the movable foot is eccentric to the gravity center of the suction tube when the suction tube sinks, so that change of the gravity leads to relocation of the suction tube along the circumference;

8) Sludge turnover and relocation: the remote control is started to command the limit switch to normally close the solenoid valve, then the ballast tank floats such that the outer pipe is entirely withdrawn for relocation or plant management; after a new position is selected, the remote control is started again to control the outer pipe to sink together with other components for operation at the new position;

9) The device using solar energy increases the aeration efficiency by 50%, and changes operating positions without manual work in water; the device runs without cost during operation, handles the hazardous substances in the sediments at the bottom and applies to areas without adequate power supply; moreover, the algae can absorb hazardous substances in water in a limited amount, so automatic relocation is needed.

Figure 1:
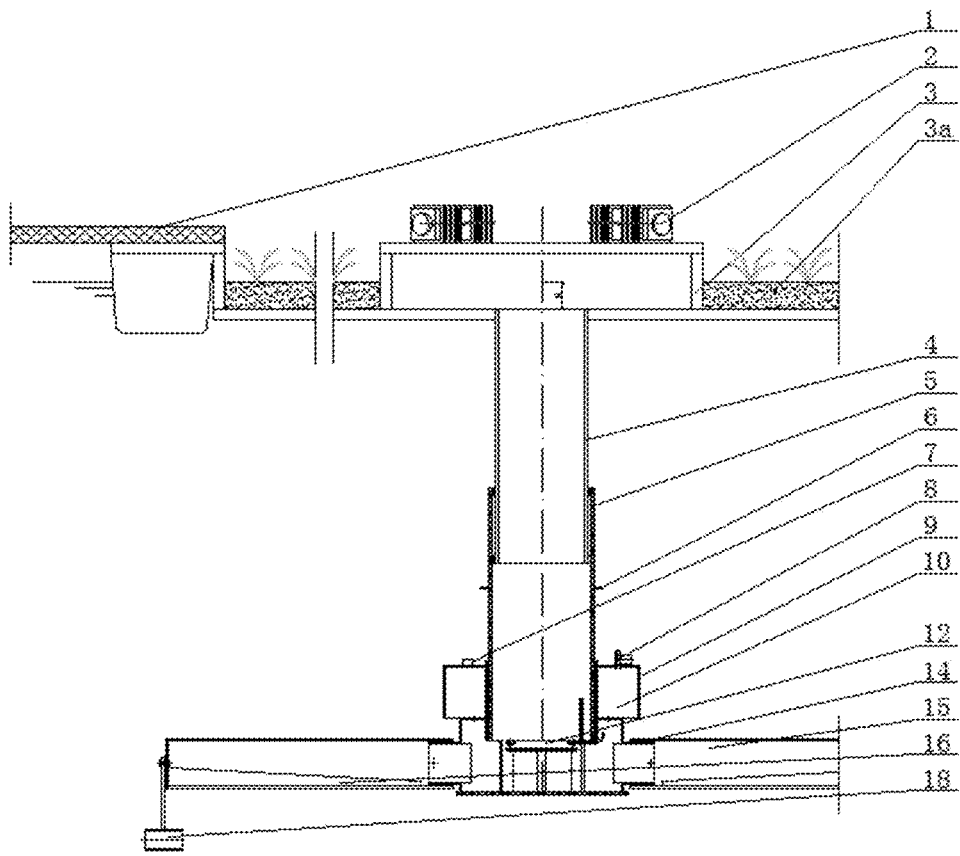
FIG. 1 is a structural view of a solar-powered aeration device for sludge turnover and planting of the present invention.

Solar panel 1; air pump 2; floating body 3; grow bed 3a; inner pipe 4; outer pipe 5; baffle 6; limit switch 7; solenoid valve 8; ballast tank 9; sliding sleeve 9a; air chamber 10; air collection chamber 11; air vent 11a; aeration ring 12; micro-hole plate 12a; U-shaped air opening 12b; air outlet pipe 12c; basal plate 13; support 13a; water inlet pipe 14; zig-shaped hole 14a; seal strip 14b; suction tube 15; suction opening 16; angle limiter 17; movable foot 18.

DETAILED DESCRIPTION

The present invention is described in more detail below with reference to the accompanying drawings and specific examples.

Referring to FIG. 1, a solar-powered aeration device for sludge turnover and planting includes a floating body 3. A grow bed 3a is fixed on the floating body 3 and floats on water, and the floating body 3 is fixedly provided with at least one air pump 2. A bottom of the floating body 3 is fixedly connected with an inner pipe 4; an outer pipe 5 is sleeved outside the inner pipe 4; and a group of baffles 6 are fixed on an outer wall of the outer pipe 5. The outer pipe 5 is nested in an air chamber 10; a bottom of the air chamber 10 communicates and is fixedly connected with a water inlet pipe 14; the water inlet pipe 14 laterally communicates with a suction tube 15; and the suction tube 15 swings up and down relative to the water inlet pipe 14. The baffles 6 correspond to the top face of the air chamber 10, and the air chamber 10 can drive the outer pipe 5 via the baffles 6 to move upward. The air pump 2 communicates with the air chamber 10 via the inner pipe 4 and the outer pipe 5 sequentially. An aeration ring 12 is fixedly arranged at a bottom of the outer pipe 5 and has an air outlet pipe 12c in communication with the outside. A movable foot 18 is rotationally provided at a tail end of the suction tube 15; the movable foot 18 adapts to surface fluctuations to swing in a range limited by an angle limiter 17; and the suction tube 15 has a suction opening 16 with an inner diameter which reduces from the outside to the inside.

Figure 2:
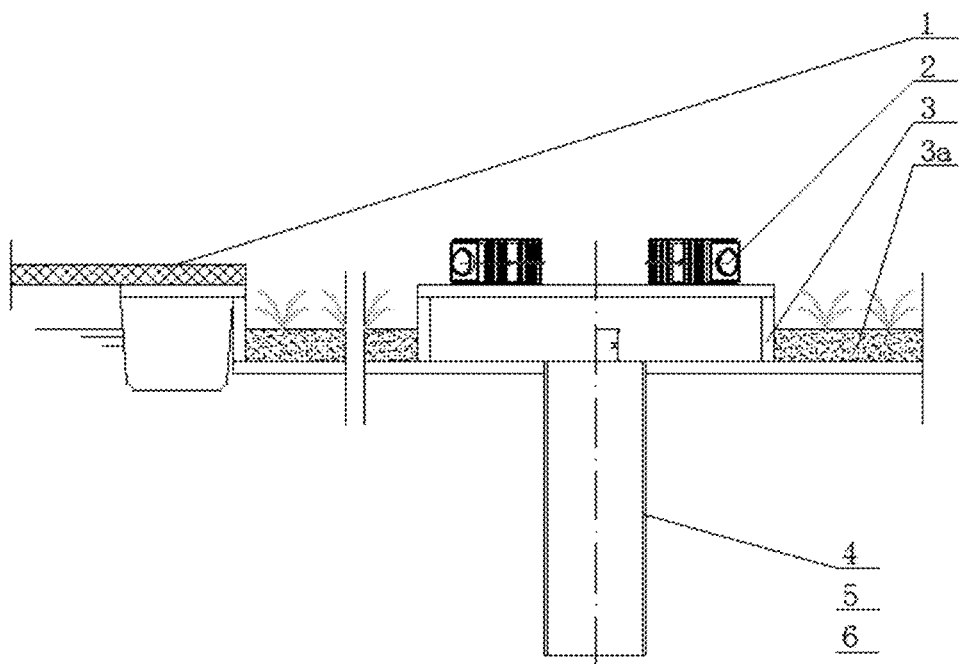
FIG. 2 is a structural view of an upper part of the solar-powered aeration device for sludge turnover and planting of the present invention.

Referring to FIG. 1-2, two air pumps are arranged on the floating body 3 in parallel, working alternatively or at the same time upon the intensity of sunlight; and plants or vegetables with strong deep roots are planted on the grow bed 3a.

Figure 3:
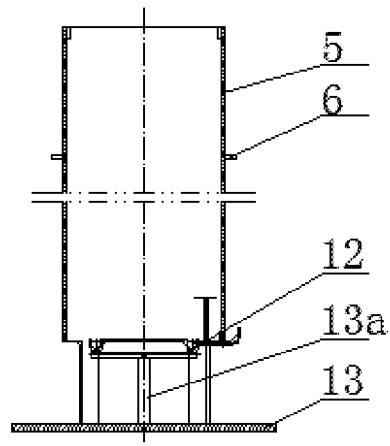
FIG. 3 is a structural view of components including an outer pipe and an aeration ring.
Figure 4:
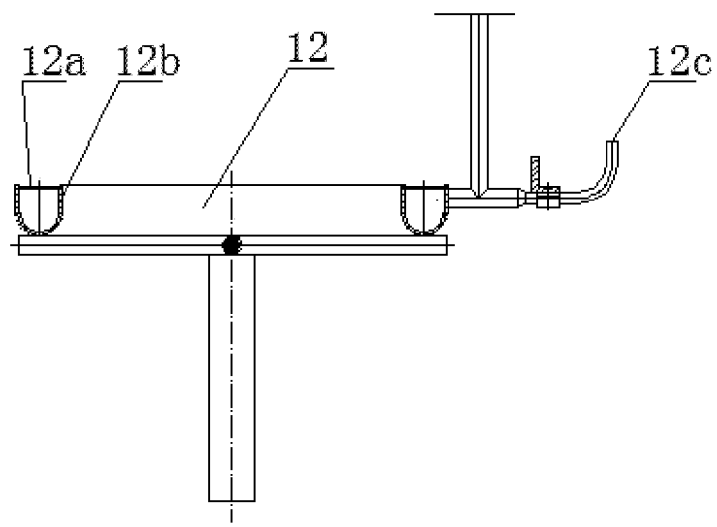
FIG. 4 is an enlargement view of the aeration ring in FIG. 3.

Referring to FIG. 1-3, the inner pipe 4 is fixed under the floating body 3; the opening of the inner pipe is at a distance of H away from the water surface, and H is the circulation height of the water surface.

Referring to FIG. 3, several openings are provided below the outer pipe 5, each with a cross section bigger than that of the outer pipe 5; the aeration ring 12 is fixed on a support 13a; the cross section of the aeration ring 12 is U-shaped; a thin micro-hole plate 12a is provided at an U-shaped upper opening; an air outlet hose of the air pump communicates with the aeration ring 12 and an air opening 12b; the air opening 12b is provided in an air collection chamber 11; a basal plate 13 is fixed under the openings below the outer pipe 5; and the support 13a is fixed on the basal plate 13.

Figure 5:
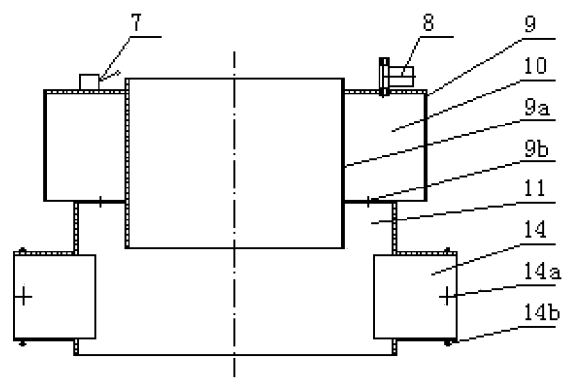
FIG. 5 is a structural view of components including an air chamber and an air collection chamber.

Referring to FIG. 5, a limit switch 7 and a solenoid valve 8 are arranged on the top surface of the air chamber 10; the limit switch 7 controls the solenoid valve 8 to open or close; the annular air collection chamber 11 surrounds a middle-lower portion of a sliding sleeve 9a; the air collection chamber 11 has an air vent 9b on the top; the air opening 12b is formed in the air collection chamber; the water inlet pipe 14 is arranged at an outer wall of the air collection chamber 11; a zig-shaped hole 14a is formed at a middle portion of each of the two sides of the pipe opening of the water inlet pipe 14; a seal strip 14b corresponding to the zig-shaped hole 14a is provided at the top and bottom surfaces of the pipe opening, and the sliding sleeve 9a is movably sleeved outside the outer pipe 5.

Figure 6:
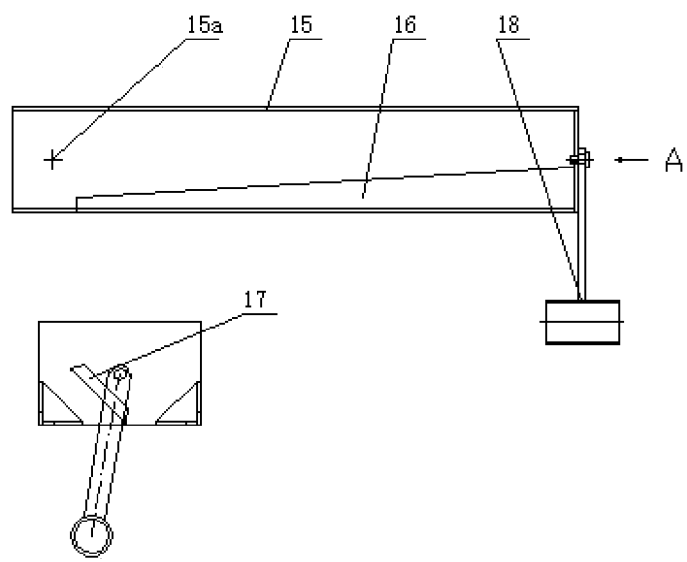
FIG. 6 is a structural view of components including a suction tube and a movable foot.
Figure 7:
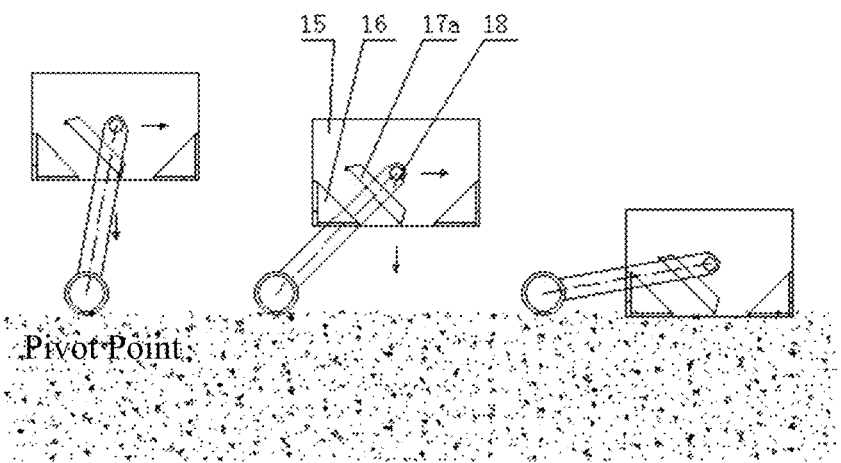
FIG. 7 is a schematic view of self-adaptive adjustment of the movable foot to different bottom heights.
Figure 7:
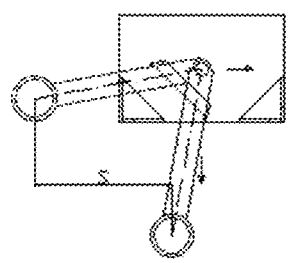
Figure 8:
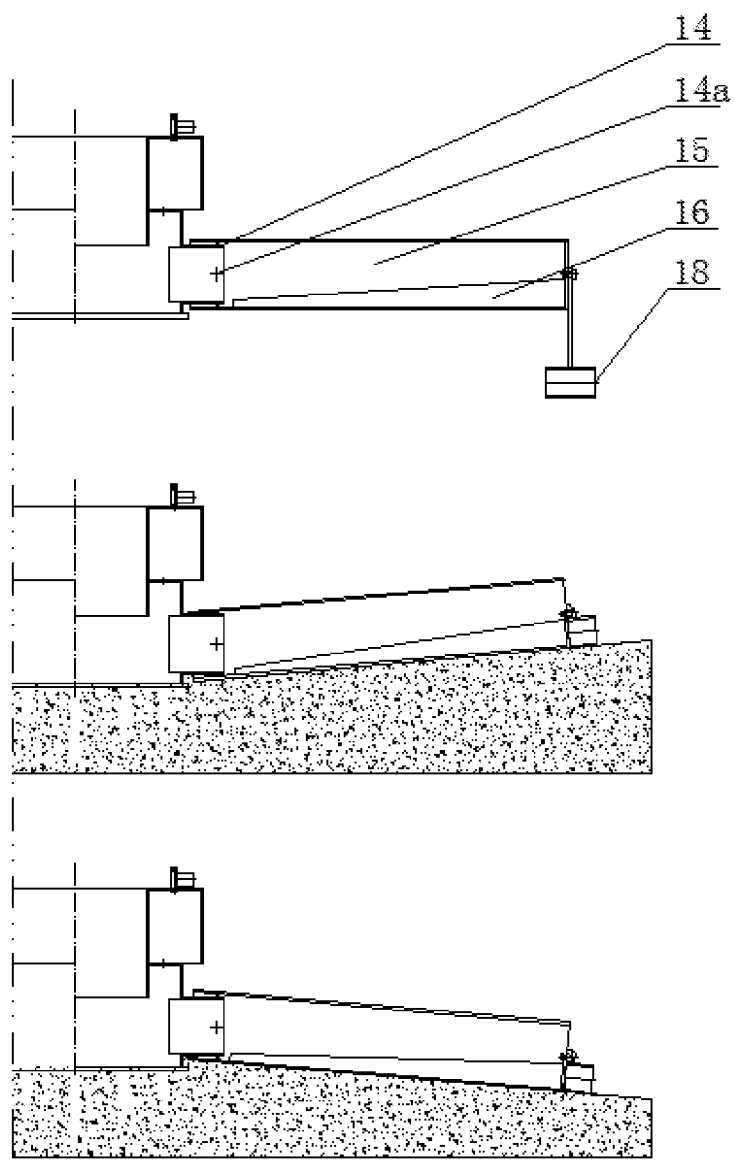
FIG. 8 is a schematic view of the fluctuation of the suction tube.
Figure 9:
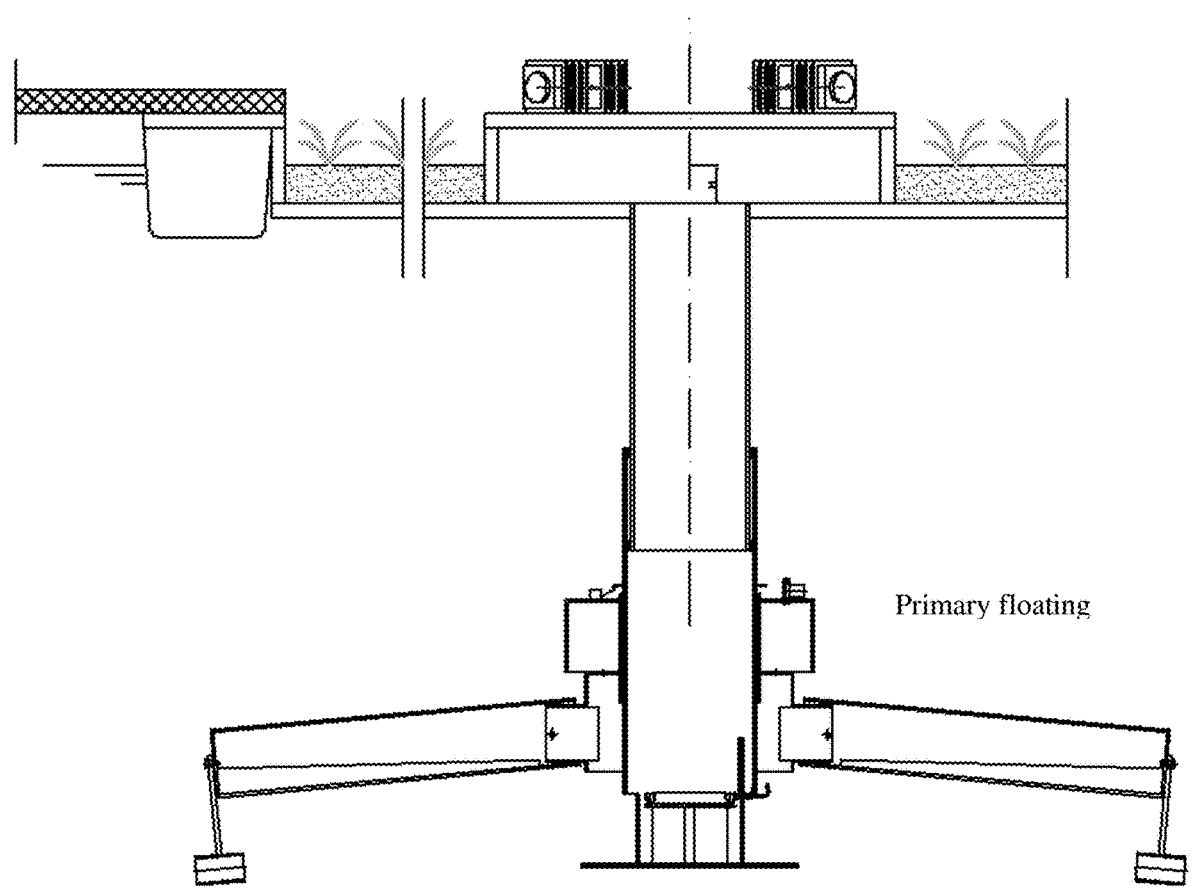
FIG. 9 is a schematic view of a primary floating state.
Figure 10:
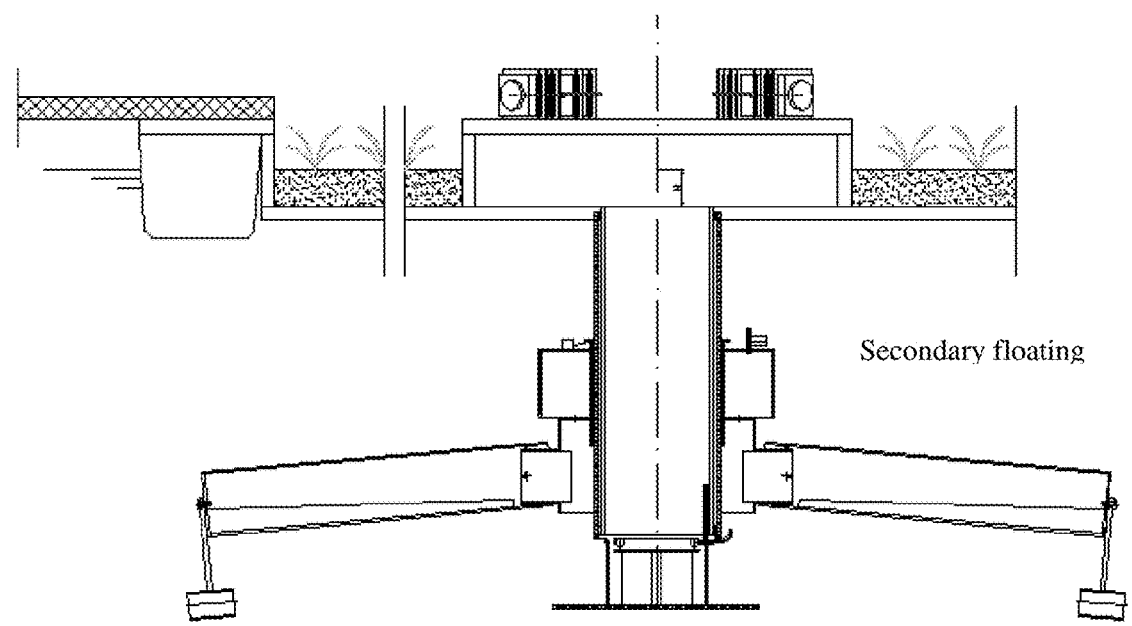
FIG. 10 is a schematic view of a secondary floating state.
Figure 11:
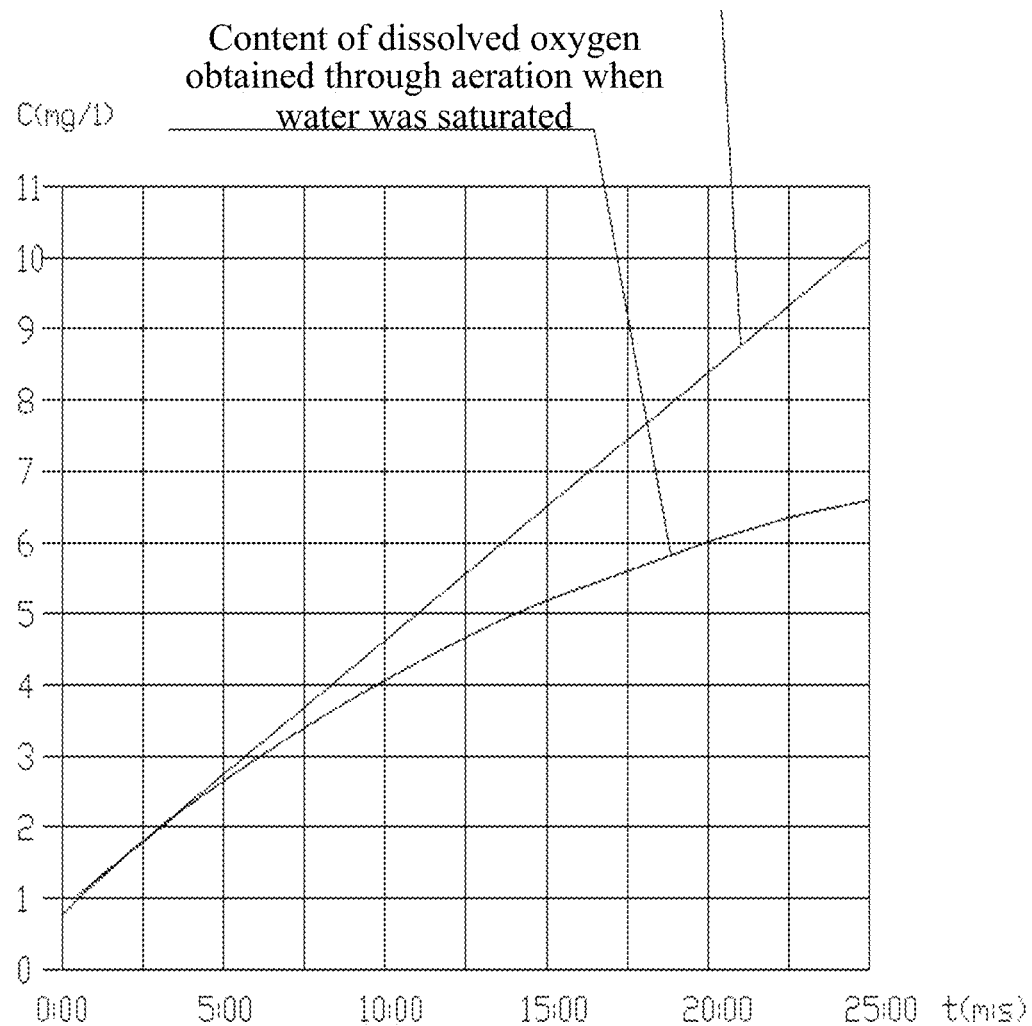
FIG. 11 is a schematic view of the content of the dissolved oxygen obtained in an aeration test.

Referring to FIG. 1 and FIG. 6, the suction tube 15 is rectangular; a zig-shaped hole 15a is formed at a middle portion of the two sides of the front end of the suction tube; the zig-shaped hole 15a of the suction tube 15 is connected with the zig-shaped hole 14a such that the suction tube 15 can move up and down on the water inlet pipe 14; each time when a ballast tank 9 completes a cycle of moving up and down, the suction tube 15 is re-located at the water bottom; the suction opening 16 becomes bigger from the inside to the outside and therefore can uniformly suck sludge in a circumferential way; as the movable foot 18 is installed at an outside wall of the suction tube 15, the movable foot 18 inclines backwards by the limit of the angle limiter 17 after the suction tube 15 rises.

Referring to FIG. 5, a remote control controls the limit switch 7 to normally close the solenoid valve 8; as the buoyancy increases, the ballast tank 9 jacks up the baffles 6 to drive the outer pipe 5 and other components to float continuously until the outer pipe 5 is completely withdrawn; after a new location is selected, the remote control is operated to exhaust air in the ballast tank 9 such that the outer pipe 5 sinks together with other components.

In embodiment, referring to FIG. 1-14, the floating body 3 floated on the surface of water; the floating body 3 was provided with a solar panel 1 and two air pumps; for proper use of the solar energy, two air pumps worked at the same time under normal circumstance and alternatively in case of inadequate sunlight so as to prolong the working cycle; the grow bed 3a was fixed on the floating body 3; plants with strong deep roots were planted on the grow bed 3a; the pipe opening of the inner pipe 4 was at a distance of H away from water surface; an air outlet of each air pump communicated with the aeration ring 12; the aeration ring 12 was fixed on the support 13a in the outer pipe 5; and the air opening 12b was provided in the air collection chamber 11. When the air pumps were started, the aeration ring 12 conducted aeration in the outer pipe 5 such that water entered the suction opening 16, flowed through the suction tube 15 and the outer pipe 5 sequentially and finally flowed out via the pipe opening of the inner pipe 4. The U-shaped aeration ring 12 can prevent the counterflow caused by shutdown from blocking micro holes, and avoid an air pressure from accelerating the water flow during aeration, and aeration in pipes can enhance the content of oxygen dissolved in water by 50% in comparison with aeration in normal state. At the same time, air accumulated in the air collection chamber 11; when the air pressure in the air collection chamber 11 was greater than the attraction force of the water flow, air flowed into the air chamber 10 via the air vent 9b, and water in the air chamber 10 was exhausted such that the ballast tank 9 floated in the outer pipe 5; after the limit switch 7 hit the baffles 6 to command the solenoid valve 8 to open, air was exhausted from the air chamber 10 such that the ballast tank 9 sunk. During sinking, the movable foot 18 inclined backwards; as the pivot point of the movable foot 18 was eccentric to the gravity center of the suction tube 15, change of the gravity direction of the suction tube 15 resulted in relocation of the suction tube 15 along the tangent to circumference; the suction tube 15 moved up and down on the water inlet pipe 14 and could flatly and tightly fit the uneven water bottom after sinking, improving the effect of sludge suction. The suction tube 15 was rectangular, and the suction opening 16 which became bigger from the front to the back could uniformly suck sludge circumferentially, suitable for suction at uneven water bottom of a pond. Circumferential suction at a bottom of the pond for aeration and sludge turnover enhanced the content of dissolved oxygen in water and removed $NH_3$ and $H_2S$ as well as other volatile hazardous substances in water by oxidation and volatilization. Aeration helped the bottom water of the pool mix with the surface water, and algae absorbed hazardous substances in water and released oxygen at the presence of sunlight, further increasing the content of dissolved oxygen in water. Also, plants with strong deep roots further absorbed a great amount of $NH_3$ and $H_2S$ as well as other hazardous substances in water and finally released fresh oxygen. As the suction tube 15 rose and sunk time by time, it was repeatedly relocated in a circumferential direction until the sludge in a circumferential area was completely overturn. Sludge turnover and relocation: the remote control 8a was started to command the limit switch 7 to normally close the solenoid valve 8; the ballast tank 9 floated to jack up the baffles 6 on the outer pipe 5 such that the outer pipe 5 was entirely withdrawn; a rope fixed at the floating body 3 was manually pulled for changing a location; then, the remote control was started to command the limit switch 7 to open the solenoid valve 8, the air in the ballast tank 9 was exhausted such that the outer pipe 5 entirely sunk together with other components, and the suction tube 15 fit the water bottom to do the cycle of overturning the sludge. Each time when a cycle of moving up and down is completed, the suction tube 15 was relocated along the tangent to circumference, and the suction tube 15 could flatly fit the water bottom. At the same time, plants or vegetables with strong deep roots were planted on the grow bed 3a to absorb the hazardous substances in water. The solar-powered aeration device for sludge turnover is simple and low in manufacturing cost, achieves a good effect of overturning the sludge, and runs without cost.

Figure 12:
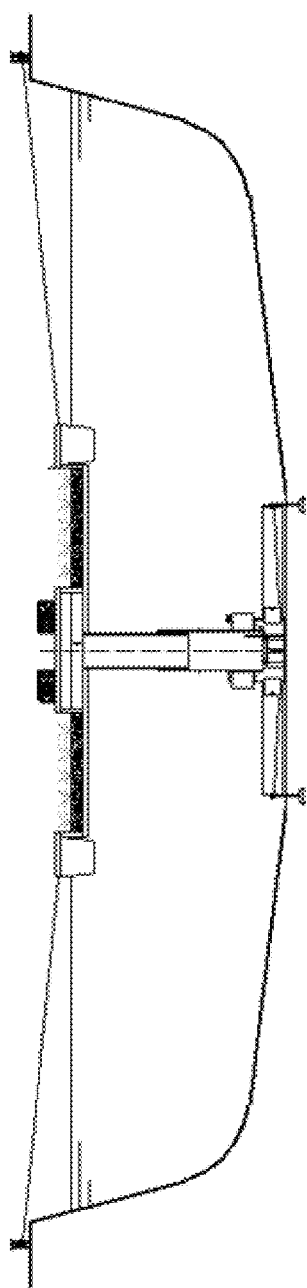
FIG. 12 is a structural view of the solar-powered aeration device for sludge turnover and planting in a pond, where floating bodies on two sides are drawn and fixed on both sides of a pond by traction ropes.

Referring to FIG. 12, the solar-powered aeration device for sludge turnover and planting is arranged in a pond; floating bodies on two sides were drawn and fixed on both sides of the pond by traction ropes. The device can change positions by manual traction or traction by an actuating unit.

Figure 13:
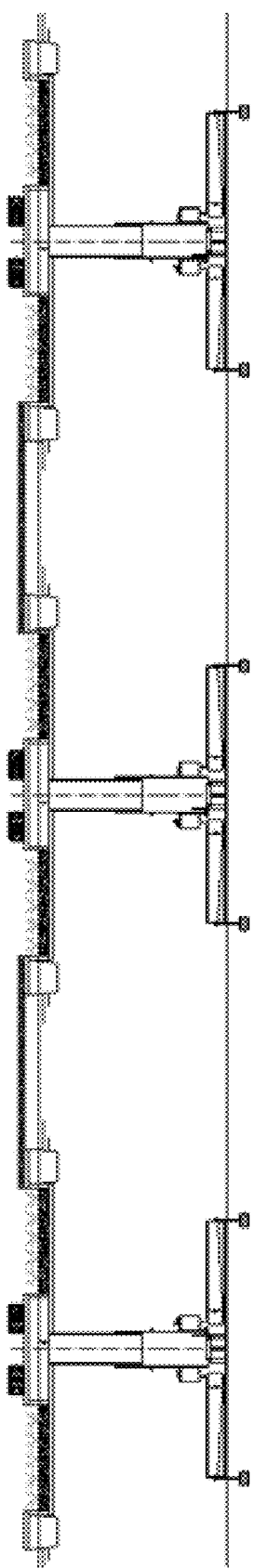
FIG. 13 is a front view of a system of a plurality of solar-powered aeration devices for sludge overturn and planting, which are connected sequentially.
Figure 14:
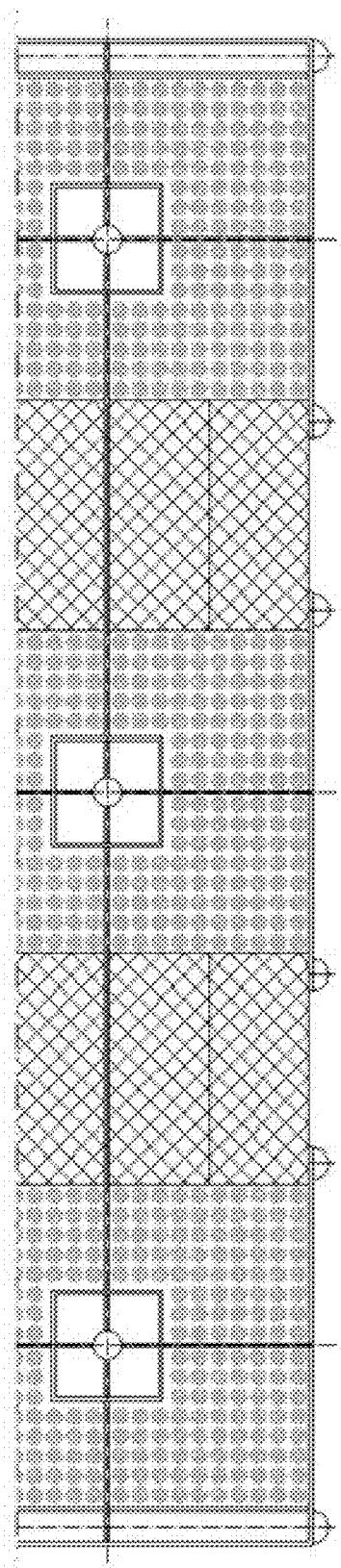
FIG. 14 is a top view of FIG. 13.

Referring to FIG. 13-14, a plurality of solar-powered aeration devices for sludge turnover and planting are connected sequentially to form a system, which can overturn sludge in the pond, perform aeration, and carry out purification with green plants.

The above described are merely preferred examples of the present invention. It should be noted that various changes and improvements can be made by those of ordinary skill in the art based on the examples without departing from the concept of the present invention, but these changes and improvements should fall within the protection scope of the present invention.

What is claimed is:

1. A solar-powered aeration device for sludge turnover and planting, comprising:
    a floating body (3), wherein a grow bed (3a) is fixed on the floating body (3) and floats on water, the floating body (3) is fixedly provided with at least one air pump (2);
    a bottom of the floating body (3) is fixedly connected with an inner pipe (4), an outer pipe (5) is sleeved on the inner pipe (4), a group of baffles (6) are fixed on an outer wall of the outer pipe (5); the outer pipe (5) is nested in an air chamber (10), a bottom of the air chamber (10) communicates and is fixedly connected with a water inlet pipe (14), the water inlet pipe (14) laterally communicates with a suction tube (15), the suction tube (15) swings up and down relative to the water inlet pipe (14); the baffles (6) correspond to a top face of the air chamber (10), the air chamber (10) can drive the outer pipe (5) via the baffles (6) to move upward;
    the air pump (2) communicates with the air chamber (10) via the inner pipe (4) and the outer pipe (5) sequentially;
    an aeration ring (12) is fixedly arranged at a bottom of the outer pipe (5) and has an air outlet pipe (12c) in communication with an outside of the aeration ring (12);
    a movable foot (18) is rotationally provided at a tail end of the suction tube (15), the movable foot (18) adapts to surface fluctuations to swing in a range limited by an angle limiter (17), and the suction tube (15) has a suction opening (16) with an inner diameter which reduces from the outside to an inside of the suction tube (15).

2. The solar-powered aeration device according to claim 1, wherein two air pumps are arranged on the floating body (3) in parallel, working alternatively or at the same time upon an intensity of sunlight; and
    plants or vegetables are planted on the grow bed (3a).

3. The solar-powered aeration device according to claim 1, wherein the inner pipe (4) is fixed under the floating body (3), and a pipe opening of the inner pipe is at a distance of H away from water surface, and H is a circulation height of the water surface.

4. The solar-powered aeration device according to claim 1, wherein several openings are provided below the outer pipe (5), each with a cross section bigger than that of the outer pipe (5); the aeration ring (12) is fixed on a support (13a); a cross section of the aeration ring (12) is U-shaped; a micro-hole plate (12a) is provided at an U-shaped upper opening; an air outlet hose of the air pump communicates with the aeration ring (12) and an air opening (12b); the air opening (12b) is provided in an air collection chamber (11); a basal plate (13) is fixed under the openings below the outer pipe (5); and the support (13a) is fixed on the basal plate (13).

5. The solar-powered aeration device according to claim 4, wherein a limit switch (7) and a solenoid valve (8) are arranged on the top face of the air chamber (10); the limit switch (7) controls the solenoid valve (8) to open or close; the annular air collection chamber (11) surrounds a middle-lower portion of a sliding sleeve (9a); the air collection chamber (11) has an air vent (9b) on a top of the air collection chamber (11); the air opening (12b) is formed in the air collection chamber; the water inlet pipe (14) is arranged at an outer wall of the air collection chamber (11); a zig-shaped hole (14a) is formed at a middle portion of each of two sides of a pipe opening of the water inlet pipe (14); a seal strip (14b) corresponding to the zig-shaped hole (14a) is provided at a top and bottom of the pipe opening of the water inlet pipe (14), and the sliding sleeve (9a) is movably sleeved outside on the outer pipe (5).

6. The solar-powered aeration device according to claim 5, wherein the suction tube (15) is rectangular; a zig-shaped hole (15a) is formed at a middle portion of two sides of a front end of the suction tube; the zig-shaped hole (15a) of the suction tube (15) communicates with the zig-shaped hole (14a) such that the suction tube (15) can move up and down on the water inlet pipe (14); each time when a ballast tank (9) completes a cycle of moving up and down, the suction tube (15) is re-located at a water bottom; the suction opening (16) becomes bigger from the inside to the outside of the suction tube (15) and therefore can uniformly suck sludge in a circumferential way; as the movable foot (18) is installed at an outside wall of the suction tube (15), the movable foot (18) inclines backwards by a limit of the angle limiter (17) after the suction tube (15) rises.

7. The solar-powered aeration device according to claim 6, wherein a remote control controls the limit switch (7) to normally close the solenoid valve (8); as a buoyancy of the ballast tank (9) increases, the ballast tank (9) jacks up the baffles (6) to drive the outer pipe (5) and other components to float continuously until the outer pipe (5) is completely withdrawn; after a new location is selected, the remote control is operated to exhaust air in the ballast tank (9) such that the outer pipe (5) sinks together with other components.

8. A working method of a solar-powered aeration device for sludge turnover and planting, wherein, the solar-powered aeration device for sludge turnover and planting comprises:
a floating body (3), wherein a grow bed (3a) is fixed on the floating body (3) and floats on water, the floating body (3) is fixedly provided with t air pumps (2);
a bottom of the floating body (3) is fixedly connected with an inner pipe (4), an outer pipe (5) is sleeved on the inner pipe (4), a group of baffles (6) are fixed on an outer wall of the outer pipe (5); the outer pipe (5) is nested in an air chamber (10), a bottom of the air chamber (10) communicates and is fixedly connected with a water inlet pipe (14), the water inlet pipe (14) laterally communicates with a suction tube (15), the suction tube (15) swings up and down relative to the water inlet pipe (14); the baffles (6) correspond to a top face of the air chamber (10), the air chamber (10) can drive the outer pipe (5) via the baffles (6) to move upward;
each of the air pumps (2) communicates with the air chamber (10) via the inner pipe (4) and the outer pipe (5) sequentially;
an aeration ring (12) is fixedly arranged at a bottom of the outer pipe (5) and has an air outlet pipe (12c) in communication with an outside of the aeration ring (12);
a movable foot (18) is rotationally provided at a tail end of the suction tube (15), the movable foot (18) adapts to surface fluctuations to swing in a range limited by an angle limiter (17), and the suction tube (15) has a suction opening (16) with an inner diameter which reduces from an outside to an inside of the suction tube (15); and
wherein several openings are provided below the outer pipe (5), each with a cross section bigger than that of the outer pipe (5); the aeration ring (12) is fixed on a support (13a); a cross section of the aeration ring (12) is U-shaped; a micro-hole plate (12a) is provided at an U-shaped upper opening; an air outlet hose of the air pump communicates with the aeration ring (12) and an air opening (12b); the air opening (12b) is provided in an air collection chamber (11); a basal plate (13) is fixed under the openings below the outer pipe (5); and the support (13a) is fixed on the basal plate (13);
the method comprising:
floating the floating body (3) on a water surface; wherein the floating body (3) is provided with a solar panel (1) and the two air pumps; for proper use of solar energy, the two air pumps work at the same time under normal circumstance and alternatively in case of inadequate sunlight so as to prolong a working cycle; the grow bed (3a) is fixed on the floating body (3); plants are planted on the grow bed (3a); a pipe opening of the inner pipe (4) is at a distance of H away from water surface; an air outlet of each of the air pumps communicates with the aeration ring (12); the aeration ring (12) is fixed on the support (13a) in the outer pipe (5); the air opening (12b) is provided in the air collection chamber (11); and
activating the air pumps are started, wherein the aeration ring (12) performs aeration in the outer pipe (5) such that water enters the suction opening (16), flows through the suction tube (15) and the outer pipe (5) sequentially and finally flows out via the pipe opening of the inner pipe (4); and the U shaped aeration ring (12) can prevent counterflow caused by air accumulates in the air collection chamber (11), when an air pressure in the air collection chamber (11) is greater than an attraction force of water flow, air flows into the air chamber (10) via an air vent (9b), and water in the air chamber (10) is exhausted such that a ballast tank (9) floats in the outer pipe (5); after a limit switch (7) hits the baffles (6) to command a solenoid valve (8) to open, air is exhausted from the air chamber (10) such that the ballast tank (9) sinks; during sinking, the movable foot (18) inclines backwards; as a pivot point of the movable foot (18) is eccentric to a gravity center of the suction tube (15), change of a gravity direction of the suction tube (15) results in relocation of the suction tube (15) along a tangent to circumference; the suction tube (15) moves up and down on the water inlet pipe (14) and can flatly and tightly fits an uneven water bottom after sinking; the suction tube (15) is rectangular, and the suction opening (16) which becomes bigger from the inside to the outside of the suction tube, uniformly suck sludge circumferentially; circumferential suction is performed at a bottom of a pond for aeration and sludge turnover;

transferring to a new location for sludge turnover, wherein a remote control (8*a*) is started to command the limit switch (7) to normally close the solenoid valve (8); the ballast tank (9) floats to jack up the baffles (6) on the outer pipe (5) such that the outer pipe (5) is entirely withdrawn; a rope fixed at the floating body (3) is manually pulled for changing a location; then, the remote control is started to command the limit switch (7) to open the solenoid valve (8), air in the ballast tank (9) is exhausted such that the outer pipe (5) entirely sinks together with other components, and the suction tube (15) fits a water bottom for overturning sludge;

relocating the suction tube (15) along the tangent to circumference each time when a cycle of moving up and down is completed, and wherein the suction tube (15) can flatly fit the water bottom.

\* \* \* \* \*